(12) United States Patent
Oguri et al.

(10) Patent No.: US 10,850,729 B2
(45) Date of Patent: Dec. 1, 2020

(54) COLLISION DETERMINATION DEVICE AND COLLISION DETERMINATION SYSTEM

(71) Applicant: DENSO CORPORATION, Kariya (JP)

(72) Inventors: Takaharu Oguri, Kariya (JP); Yosuke Ito, Kariya (JP); Kei Kamiya, Kariya (JP); Takahiro Baba, Kariya (JP); Kouichi Masuda, Kariya (JP)

(73) Assignee: DENSO CORPORATION, Kariya (JP)

( * ) Notice: Subject to any disclaimer, the term of this patent is extended or adjusted under 35 U.S.C. 154(b) by 108 days.

(21) Appl. No.: 15/855,865

(22) Filed: Dec. 27, 2017

(65) Prior Publication Data

US 2018/0178790 A1 Jun. 28, 2018

(30) Foreign Application Priority Data

Dec. 27, 2016 (JP) ................................. 2016-252476

(51) Int. Cl.
*B60W 30/095* (2012.01)
*B60W 30/09* (2012.01)
(Continued)

(52) U.S. Cl.
CPC ........ *B60W 30/0956* (2013.01); *B60W 30/09* (2013.01); *G06K 9/00798* (2013.01);
(Continued)

(58) Field of Classification Search
CPC ............. B60W 30/0956; B60W 30/09; B60W 2554/00; B60W 2420/42; B60W 2555/60; B60W 50/14; G08G 1/166; G08G 1/167; G08G 1/16; G06K 9/00805; G06K 9/00798
(Continued)

(56) References Cited

U.S. PATENT DOCUMENTS

2010/0030426 A1* 2/2010 Okita ........................ B60T 7/22
 701/41
2012/0283895 A1* 11/2012 Noda ..................... G08G 1/166
 701/1
(Continued)

FOREIGN PATENT DOCUMENTS

JP 2004-136788 5/2004
JP 2010-013012 1/2010
JP 2011-170762 9/2011

*Primary Examiner* — Muhammad Shafi
(74) *Attorney, Agent, or Firm* — Maschoff Brennan

(57) ABSTRACT

A collision determination device for determining the probability of a collision between an own vehicle and a target in the predetermined determination area surrounding the own vehicle includes an orientation detection unit for detecting the orientation of the target relative to the own vehicle, an image sensor for capturing images surrounding the own vehicle, an angle calculation unit for calculating an angle $\theta_0$ formed by the movement direction of the own vehicle and the movement direction of the target, and a collision determination unit which uses image data acquired from the image sensor to calculate the state of a lane compartment line, and determines the probability of a collision between the own vehicle and the target based on the angle $\theta_0$ and the calculation result of the lane compartment line.

10 Claims, 10 Drawing Sheets

(51) Int. Cl.
 *G08G 1/16* (2006.01)
 *G06K 9/00* (2006.01)
(52) U.S. Cl.
 CPC .......... *G06K 9/00805* (2013.01); *G08G 1/16* (2013.01); *G08G 1/166* (2013.01); *G08G 1/167* (2013.01); *B60W 2420/42* (2013.01); *B60W 2554/00* (2020.02)
(58) Field of Classification Search
 USPC ........................................................ 701/23
 See application file for complete search history.

(56) References Cited

U.S. PATENT DOCUMENTS

| | | | |
|---|---|---|---|
| 2014/0139368 A1 | 5/2014 | Takaki | |
| 2014/0292502 A1* | 10/2014 | Sakima | ................ B60W 30/09 340/435 |
| 2017/0166254 A1* | 6/2017 | Katoh | ...................... B62D 6/00 |
| 2017/0217431 A1* | 8/2017 | Class | .................. B60R 21/0134 |
| 2017/0217432 A1 | 8/2017 | Minemura et al. | |
| 2018/0162392 A1* | 6/2018 | Takaki | ................. B60W 30/09 |

* cited by examiner

| ANGLE $\theta_0$ | PROBABILITY OF CHANGE |
|---|---|
| $-30\deg \leq \theta_0 \leq 30\deg$ | LOW |
| $-90\deg \leq \theta_0 < -30\deg$<br>$30\deg < \theta_0 \leq 90\deg$ | MEDIUM |
| $-180\deg \leq \theta_0 < -90\deg$<br>$90\deg < \theta_0 \leq 180\deg$ | HIGH |

FIG.5

| LIKELIHOOD OF COLLISION CP | | PRESENCE OF LANE COMPARTMENT LINE CL | |
|---|---|---|---|
| | | NO | YES |
| PROBABILITY OF CHANGE | LOW | 6 | 5 |
| | MEDIUM | 5 | 4 |
| | HIGH | 4 | 3 |

FIG.6

| LIKELIHOOD OF COLLISION CP | EXTENT OF THE COLLISION AVOIDANCE PROCESS |
|---|---|
| 1 | 1 |
| 2 | 2 |
| 3 | 3 |
| 4 | 4 |
| 5 | 5 |
| 6 | 6 |
| 7 | 7 |
| 8 | 8 |
| 9 | 9 |
| 10 | 10 |

FIG.11

| LIKELIHOOD OF COLLISION CP | | ABSOLUTE VALUE OF THE ANGULAR DIFFERENCE $\theta_2$ | | |
|---|---|---|---|---|
| | | $\theta_2 \leq 5\text{deg}$ | $5\text{deg} < \theta_2 \leq 30\text{deg}$ | $30\text{deg} < \theta_2 \leq 180\text{deg}$ |
| ANGULAR DIFFERENCE D1 | D1 ≤ 5deg | 3 | 4 | 5 |
| | 5deg < D1 ≤ 30deg | 4 | 5 | 6 |
| | 30deg < D1 ≤ 180deg | 5 | 6 | 7 |

| AMOUNT OF CHANGE AB | CORRECTION VALUE CVa |
|---|---|
| 10 deg OR MORE | −1 |
| LESS THAN 10 deg | 0 |

| AMOUNT OF CHANGE AC | CORRECTION VALUE CVb |
|---|---|
| 10 deg OR MORE | −1 |
| LESS THAN 10 deg | 0 |

| TYPE OF LANE COMPARTMENT LINE | CORRECTION VALUE CVc |
|---|---|
| FIRST TYPE | −1 |
| SECOND TYPE | 1 |

| CORRECTION VALUE | | ABSOLUTE VALUE OF THE ANGULAR DIFFERENCE $\theta_2$ | | |
|---|---|---|---|---|
| | | $\theta_2 \leq 5\deg$ | $5\deg < \theta_2 \leq 30\deg$ | $30\deg < \theta_2 \leq 180\deg$ |
| ANGULAR DIFFERENCE D1 | $D1 \leq 5\deg$ | −4 | −3 | −2 |
| | $5\deg < D1 \leq 30\deg$ | −3 | −2 | −1 |
| | $30\deg < D1 \leq 180\deg$ | −2 | −1 | 0 |

291d

COLLISION DETERMINATION DEVICE AND COLLISION DETERMINATION SYSTEM

CROSS-REFERENCE TO RELATED APPLICATION

This application is based on and claims the benefit of priority from earlier Japanese Patent Application No. 2016-252476 filed Dec. 27, 2016, the description of which is incorporated herein by reference.

BACKGROUND

Technical Field

The present disclosure relates to the technology for determining the probability of a collision between an own vehicle and a target and the technology for avoiding a collision between the own vehicle and the target.

Description of the Related Art

The technology for avoiding collisions is conventionally known. For example, Japanese Patent No. 5846109 discloses the technology for determining the probability of a collision such that the higher the probability of a collision, the smaller the absolute value of the angle θ, when the amount of temporal change of an angle θ formed by the movement direction of an own vehicle and the movement direction of a target is a predetermined value or less.

In the conventional technology, there are cases in which the probability of a collision is determined to be high even when the target is moving along a lane. For example, there is the case that the absolute value of the angle θ becomes smaller when another vehicle is moving along the opposite lane in a state in which the opposite lane located in front of the own vehicle gently curves. In this case, despite the fact that the probability of a collision is actually low, there are cases when a collision avoidance process such as a process for automatically applying the brakes of the own vehicle is performed. Therefore, a technology which can accurately determine the probability of a collision between an own vehicle and a target has been desired.

SUMMARY

The present disclosure provides a collision determination device which can accurately determine the probability of a collision between an own vehicle and a target.

An aspect of the present disclosure is to provide a collision determination device for determining the probability of a collision between an own vehicle and a target in a predetermined determination area surrounding the own vehicle. The collision determination device includes an orientation detection unit for detecting the orientation of the target relative to the own vehicle, an image sensor for capturing images surrounding the own vehicle, an angle calculation unit for calculating an angle $\theta_0$ formed by the movement direction of the own vehicle and the movement direction of the target, and a collision determination unit which uses image data acquired from the image sensor to calculate the state of a lane compartment line, and determining the probability of a collision between the own vehicle and the target based on the angle $\theta_0$ and the calculation result of the lane compartment line.

According to the collision determination device of the aforementioned embodiment, in addition to the angle $\theta_0$, the collision determination unit determines the probability of a collision between the own vehicle and the target based on the calculation result of the lane compartment line. Therefore, even in the case when the absolute value of the angle $\theta_0$ is small and the possibility that the own vehicle collides with the target is low, the possibility that the probability of a collision is determined to be high can be reduced. Therefore, the collision determination device can accurately determine the probability of a collision.

The present disclosure can be actualized by various aspects other than the collision determination device. For example, the present disclosure may be actualized by aspects such as a vehicle including a method for controlling the collision determination system, a collision determination device or a collision determination system, a program for enabling these control methods, and the collision determination device or the collision determination system.

BRIEF DESCRIPTION OF THE DRAWINGS

In the accompanying drawings:

FIG. 5 is a drawing showing a determination table;

FIG. 6 is a drawing showing a collision avoidance table;

FIG. 11 is a drawing showing the determination table;

FIG. 12 is a drawing showing a first amount of change table;

FIG. 13 is a drawing showing a second amount of change table;

FIG. 14 is a drawing showing a compartment line correction table;

FIG. 16 is a drawing showing the correction table of a third modification example.

DETAILED DESCRIPTION OF PREFERRED EMBODIMENTS

First Embodiment

Figure 1:
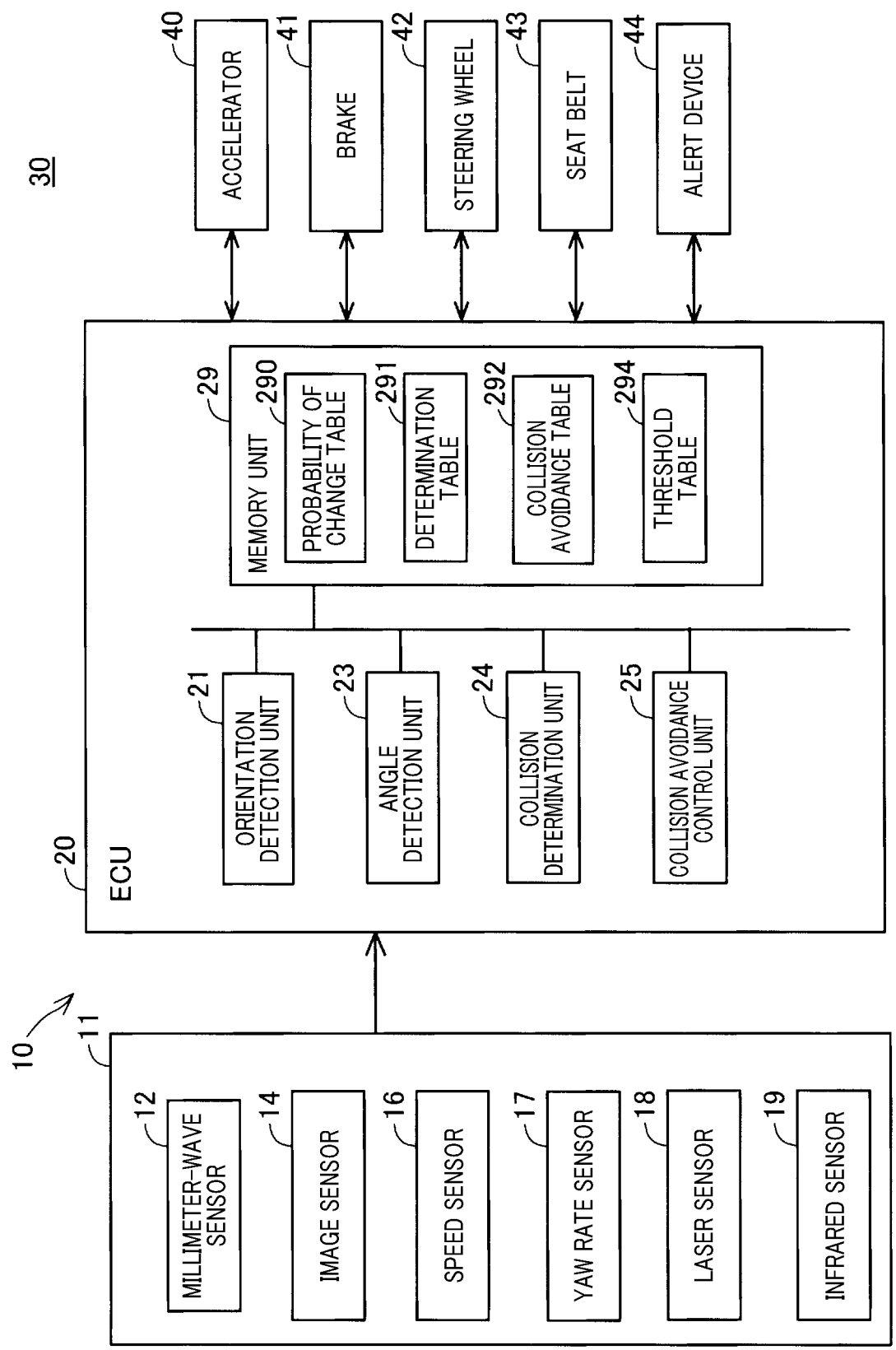
FIG. 1 is a block drawing of an on-board system of the first embodiment of the present disclosure.

The configuration of an on-board system 10 will be explained based on FIGS. 1 and 2. The on-board system 10 that is mounted in an own vehicle 30 includes a sensor section 11 and an electronic control unit (ECU) 20. The sensor section 11 and the ECU 20 are connected by an in-vehicle network (not shown). The on-board system 10 functions as a collision determination device, a collision avoidance device, and, a collision avoidance system. The on-board system 10 determines the probability of a collision between the own vehicle 30 and the target in a predetermined determination area surrounding the own vehicle 30.

The sensor section 11 includes a millimeter-wave sensor 12, an image sensor 14, a speed sensor 16, a yaw rate sensor 17, a laser sensor 18 and an infrared sensor 19. The millimeter-wave sensor 12 is attached to a front potion of the own vehicle 30, as shown in FIG. 2. The millimeter-wave sensor 12 is configured as a so-called "millimeter-wave radar" of a frequency modulated continuous wave (FMCW) system. The millimeter-wave sensor 12 transmits millimeter-wave band radar waves that have been frequency-modulated and can detect the presence, orientation, and, distance of a target which has reflected the millimeter waves.

The transmission area over which the millimeter-wave sensor 12 transmits the millimeter waves is an area that can include a target (such as another vehicle, a pedestrian, a motorcycle, or a bicycle) which is present around (e.g. in front of, to the side of, or diagonally behind) the own vehicle 30. The transmission area is the same area as the abovementioned determination area, or, is larger than the determination area and includes the determination area. In the present embodiment, the transmission area and the determination area match.

Figure 2:
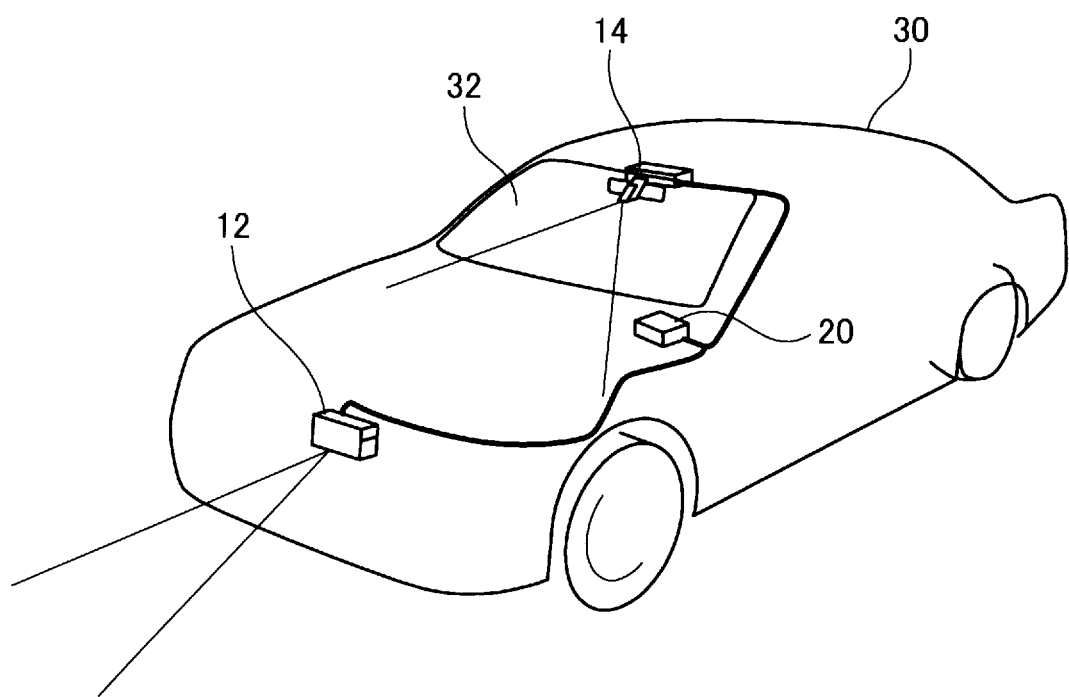
FIG. 2 is a schematic configuration drawing of an own vehicle.

As shown in FIG. 2, the image sensor 14 is attached near the top of a front windshield 32. The image sensor 14 is a camera having a known configuration, and captures the scene around the own vehicle 30. The imaging area of the image sensor 14 is an area that can include a target (such as another vehicle, a pedestrian, a motorcycle, or a bicycle) which is present around (e.g. in front of, to the side of, and diagonally behind) the own vehicle 30. The imaging area has the same range as the abovementioned determination area, or, is larger than the determination area and includes the determination area. In the present embodiment, the determination area and the imaging area match.

The speed sensor 16 detects the movement speed of the own vehicle 30. The yaw rate sensor 17 detects the angular velocity of the own vehicle 30.

The laser sensor 18 and the infrared sensor 19 are sensors respectively having known configurations. These sensors can detect a target (such as another vehicle, a pedestrian, a motorcycle, or a bicycle) which is present around (e.g. in front of, to the side of, and diagonally behind) the own vehicle 30, in the same manner as the millimeter-wave sensor 12.

The ECU 20 includes a memory unit 29 and a central processing unit (CPU) which is not shown. The memory unit 29 is configured by known elements, such as a read-only memory (ROM) and a random access memory (RAM). The ECU 20 includes an orientation detection unit 21, an angle calculation unit 23, a collision determination unit 24 and a collision avoidance control unit 25 as programs run by the CPU.

The orientation detection unit 21 detects the orientation of the target located in the determination area relative to the own vehicle 30 based on the data acquired from the millimeter-wave sensor 12. The angle calculation unit 23 calculates the angle $\theta_0$ formed by the movement direction of the own vehicle 30 and the movement direction of the target based on the detection result of the orientation detection unit 21 and the movement direction of the own vehicle 30. The collision determination unit 24 uses the image data acquired from the image sensor 14 and is located in the determination area, and, calculates the state of the lane compartment line located between the own vehicle 30 and the target. Further, the collision determination unit 24 determines the probability of a collision between the own vehicle 30 and the target based on the angle $\theta_0$ and the calculation result of the lane compartment line. The lane compartment line includes lines (not limited to, for example, white lines and yellow lines) for partitioning the driving lane of the own vehicle 30 (the own vehicle driving lane) and the driving lane of the target (the target driving lane), and three-dimensional structures such as the median strip for partitioning the own vehicle driving lane and the target driving lane.

The memory unit 29 stores a probability of change table 290, a determination table 291, a collision avoidance table 292 and a threshold table 294. The probability of change table 290 and the determination table 291 are tables to be referred to in order for the collision determination unit 24 to perform the collision determination. The collision avoidance table 292 is a table to be referred to in order for the collision avoidance control unit 25 to perform the collision avoidance process. The threshold table 294 stores the threshold for the amount of change of the angle $\theta_0$. The probability of change table 290, the determination table 291 and the collision avoidance table 292 will be described in detail hereinafter.

The ECU 20 is connected to an accelerator 40, a brake 41, a steering wheel 42, a seat belt 43 and an alert device 44 of the own vehicle 30 by an in-vehicle network (not shown), and controls these components. The alert device 44 is used to notify the user of the own vehicle 30 of a collision with the target. The alert device 44 is, for example, an LED lamp and a buzzer.

Figure 7:
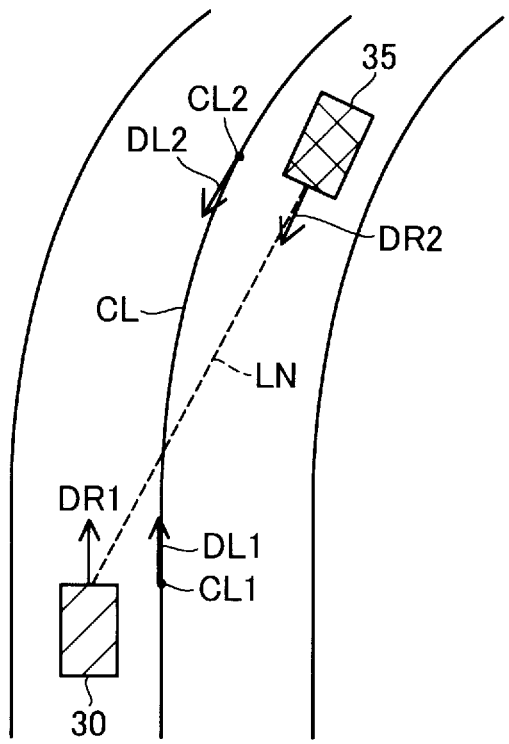
FIG. 7 is a drawing for describing the probability of a collision between the own vehicle and the target.

The collision determination process performed repeatedly at a predetermined interval by the on-board system 10 will be described using FIGS. 3 to 8. In the present embodiment, the collision determination process in the case when another vehicle is traveling in the opposite lane as the target 35 located ahead of the own vehicle 30, as shown in FIG. 7, will be described.

Figures 3, 4:
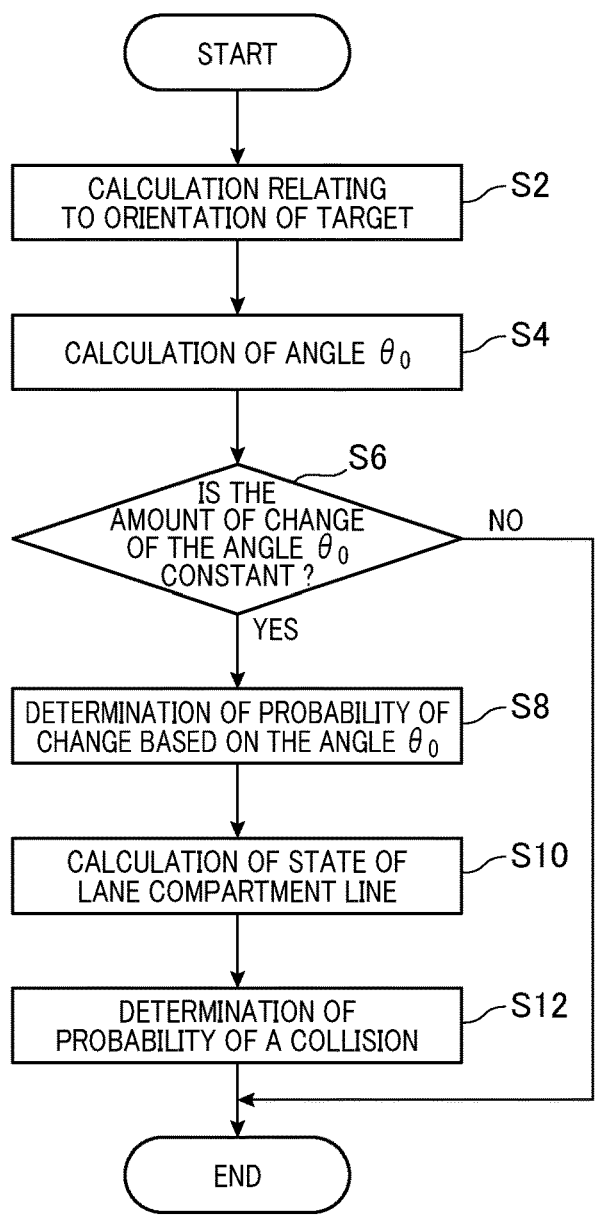
FIG. 3 is a flowchart of the collision determination process performed by the on-board system of the first embodiment.
FIG. 4 is a drawing showing a probability of change table.

First, as shown in FIG. 3, the orientation detection unit 21 uses the data acquired from the millimeter-wave sensor 12 to perform calculations relating to the orientation of the target 35 (Step S2). Specifically, the orientation detection unit 21 detects the target 35 present in the determination area and obtains the orientation of the target 35 relative to the front end of the own vehicle 30 by the calculation. Note that, the orientation detection unit 21 may use the data acquired (other sensor data) from one or more among the image sensor 14, the laser sensor 18 and the infrared sensor 19 in place of the data acquired from the millimeter-wave sensor 12 to perform calculations relating to the orientation of the target 35. Further, the orientation detection unit 21 may use the data acquired from the millimeter-wave sensor 12 with the other sensor data to perform calculations relating to the orientation of the target 35.

Figure 8:
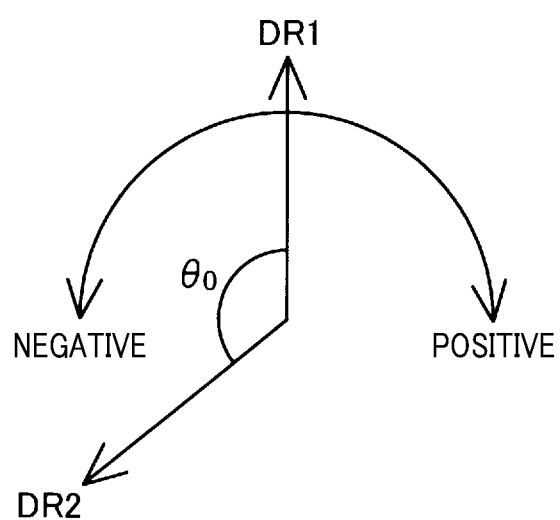
FIG. 8 is a drawing for describing a calculation method of the angle θ0.
Figure 9:
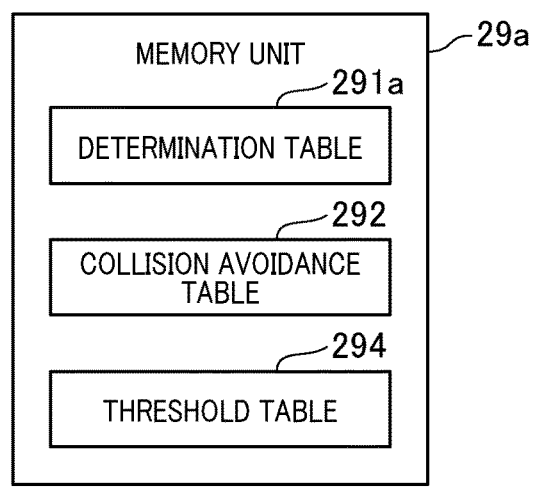
FIG. 9 is a drawing for describing a memory unit of the second embodiment.

Next, in Step S2, the collision determination unit 24 calculates the angle $\theta_0$ formed by a movement direction DR1 of the own vehicle 30 (FIG. 7) and a movement direction DR2 of the target 35 (FIG. 7) (Step S4). First, the collision determination unit 24 repeatedly acquires the relative orientation of the target 35 relative to the own vehicle 30, and, repeatedly acquires, at a predetermined interval, the distance from the own vehicle 30 to the target, and calculates the relative movement direction of the target 35 relative to the own vehicle 30 from the data acquired. Next, the collision determination unit 24 calculates the movement direction DR1 of the own vehicle 30 in a static system (road surface) using a known method, and calculates the movement direction DR2 of the target 35 in a static system using the movement direction DR1 and the relative movement direction of the target 35. Next, the collision determination unit 24 calculates the angle $\theta_0$ formed by the movement direction DR1 of the own vehicle 30 and the movement direction DR2 of the target 35. The angle $\theta_0$, as shown in FIG. 8, is 0 degrees when the movement direction DR1 of the own vehicle 30 and the movement direction DR2 of the target 35 match, and becomes a positive value when the movement direction DR2 of the target 35 turns in a clockwise direction in relation to the movement direction DR1 of the own vehicle 30, and becomes a negative value when the movement direction DR2 of the target 35 turns in a counterclockwise direction in relation to the movement direction DR1 of the own vehicle 30.

Next, the collision determination unit 24 uses the angle $\theta_0$ calculated by the process in Step S4 over the past n times and the angle $\theta_0$ calculated by the process in the present Step S4 to calculate the amount of temporal change AA of the angle $\theta_0$, and determine whether or not the amount of change AA is constant (Step S6). When the amount of change AA is greater than the predetermined threshold (the threshold specified in the threshold table 294), the collision determination unit 24 determines that the amount of change AA is not constant and ends the process. However, when the amount of change AA is at the predetermined threshold or less, the collision determination unit 24 determines that the amount of change AA is constant and performs the process in Step S8. The predetermined threshold is preferably set to a value in the range which can estimate that at least one of the own vehicle 30 and the target 35 changes the own movement direction in order to avoid a collision. The previous times n to be referred to in Step S4 may be 1 or more. Note that, Step S6 in the first embodiment may be omitted.

When the determination in Step S6 is "YES", the collision determination unit 24 determines the probability of change based on the angle $\theta_0$ calculated in the present Step S4 (Step S8). Specifically, the collision determination unit 24 uses the calculated angle $\theta_0$ and the probability of change table 290 shown in FIG. 4 to determine the probability of change. When the angle $\theta_0$ is $-30$ degrees$\leq$angle $\theta_0 \leq 30$ degrees or less, the probability of change is determined to be "low", and when the angle $\theta_0$ is $30\leq$angle$\leq\theta_0\leq 90$ degrees, or, $-90\leq$angle $\theta_0 < -30$ degrees, the probability of change is determined to be "medium", and when the angle $\theta_0$ is $90 <$angle $\theta_0 \leq 180$ deg, or, $-180\leq$angle $\theta_0 < -90$ deg, the probability of change is determined to be "high".

Next, the collision determination unit 24 calculates the state of the lane compartment line CL (Step S10). Specifically, as shown in FIG. 7, whether or not the lane compartment line CL is located between the own vehicle 30 and the target 35 is determined based on the captured images acquired from the image sensor 14. The collision determination unit 24 determines that the lane compartment line CL is located between the own vehicle 30 and the target 35 when the lane compartment line CL is located on a line segment LN connecting the own vehicle 30 with the target 35. On the one hand, the collision determination unit 24 determines that the lane compartment line CL is not located between the own vehicle 30 and the target 35 when the lane compartment line CL is not located on the line segment LN. Note that, the collision determination unit 24 may determine that the lane compartment line CL is located between the own vehicle 30 and the target 35 when the lane compartment line CL is located on a vector of at least one of the movement direction DR1 of the own vehicle 30 and the movement direction DR2 of the target 35. Note that, the sequence of Step S8 and Step S10 is not limited to the present embodiment, and Step S10 may be performed before Step S8.

Next, the collision determination unit 24 uses the results of Step S8 and Step S10, and, the determination table 291 to determine the probability of a collision CP (Step S12). As shown in FIG. 5, the determination table 291 is a table in which the probability of a collision CP is uniquely determined when the probability of change and the presence of the lane compartment line CL are input. The extent of the probability of a collision CP is indicated by an integer from 1 to 10, and indicates that the higher the numerical value is, the higher the probability of a collision between the own vehicle 30 and the target 35. As shown in FIG. 5, in the case when the angle $\theta_0$ is the same (i.e., when the probability of change is the same), when the lane compartment line CL is located between the own vehicle 30 and the target 35, the collision determination unit 24 determines that the probability of a collision CP is low compared to the case when the lane compartment line CL is not located between the own vehicle 30 and the target 35.

The collision avoidance control unit 25 performs the collision avoidance process in accordance with the determination result of the probability of a collision CP determined in Step S12. The collision avoidance process includes a process for automatically releasing the accelerator 40, a process for automatically applying the brake 41, a process for increasing the braking force of the brake 41, a process for automatically operating the steering wheel 42 and changing the movement direction DR1 of the own vehicle 30, a process for automatically changing the restraining force of the seat belt 43, and a process for changing the extent of the alert by the alert device 44. Further, the collision avoidance control unit 25 uses the determination result of the probability of a collision CP and the collision avoidance table 292 shown in FIG. 6 to determine the extent of the collision avoidance process. The extent of the collision avoidance process specified in the collision avoidance table 292 is specified with 10 levels. The smaller the number of collision avoidance processes determined in the collision avoidance table 292, the lower the extent of the collision avoidance process becomes lower. As shown in FIG. 6, the lower the probability of a collision CP, the lower the extent of the collision avoidance process becomes.

The lower the extent of the collision avoidance process, the more the collision avoidance control unit 25 reduces the number of types of collision avoidance processes to be performed. Further, the lower the extent of the collision avoidance process, the more the collision avoidance control unit 25 reduces the strength of the abovementioned collision avoidance process. For example, the lower the collision avoidance control unit 25, the more the extent of the collision avoidance process reduces the braking force of the break 41, the steering angle of the steering wheel 42, the restraining force of the seat belt 43, the illumination of the LED lamp of the alert device 44, the volume of the buzzer of the alert device 44, and the like. Further, the lower the probability of a collision CP, the more the collision avoidance control unit 25 may reduce the extent of the collision avoidance process by delaying the time period in which the collision avoidance process is executed. For example, the collision avoidance control unit 25 delays the time period in which the collision avoidance process is executed by adding a positive correction value to the time to collision TTC which is the time at which the relative distance between the own vehicle 30 and the target 35 becomes zero. The lower the probability of a collision CP, the larger value to which the positive correction value is set. The time to collision TTC is calculated by a known method by the ECU 20. In the present embodiment, when the probability of a collision CP is "10", the collision avoidance process is performed when the time to collision TTC is reached. Further, when the probability of a collision CP is smaller than "10", the predetermined positive correction value is added to the time to collision TTC, a corrected value is calculated and the collision avoidance process is performed when the corrected value is reached.

According to the aforementioned first embodiment, in addition to the angle $\theta_0$, the collision determination unit 24 determines the probability of a collision CP between the own vehicle 30 and the target 35 based on the calculation result of the lane compartment line CL (FIG. 5). Therefore, even when the absolute value of the angle $\theta_0$ is small, when it can be estimated that the likelihood of the own vehicle 30 colliding with the target 35 is low, the collision determination unit 24 determines that the probability of a collision CP is low. Therefore, the collision determination unit 24 can accurately determine the probability of a collision CP. For example, when the target 35 moves along an opposite lane which gently curves, the absolute value of the angle $\theta_0$ is small, and, the probability of change is determined to be "small". However, when the target 35 moves along the lane compartment line CL of the driving lane, it can be estimated that the likelihood of colliding with the own vehicle 30 is low. Therefore, when the lane compartment line CL is located between the own vehicle 30 and the target 35, by determining that the probability of a collision is low, collision determination having a high accuracy can be performed compared to when the lane compartment line CL is not located between the own vehicle 30 and the target 35. Further, the likelihood that unnecessary collision avoidance processes are performed can be decreased by performing collision determination having a high accuracy.

Second Embodiment

The collision determination process of the second embodiment which is repeatedly performed by the on-board system 10 at a predetermined interval will be described using FIGS. 7 and 9 to 11. The differences between the first embodiment and the second embodiment are that the memory unit 29a of the second embodiment does not have the probability of change table 290, and has the contents of the determination table 291a and the contents of the collision determination process. Since other elements are the same as in the first embodiment, an explanation thereof is appropriately omitted.

Figure 10:
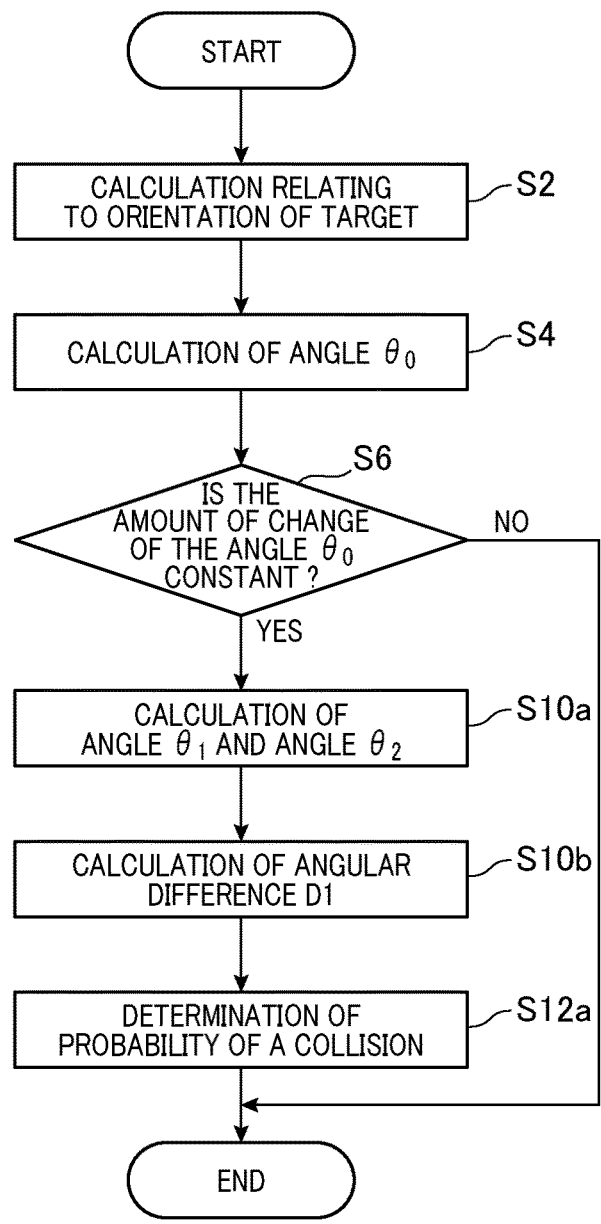
FIG. 10 is a flowchart of the collision determination process performed by the on-board system of the second embodiment.

The collision determination unit 24 performs the processes of Step S2 to Step S6 in the same manner as the first embodiment (FIG. 10). When the determination in Step S6 is "YES", the collision determination unit 24 calculates the angles $\theta_1$ and $\theta_2$ (Step S10a).

As shown in FIG. 7, the angle $\theta_1$ is an angle formed by the own vehicle tangential direction DL1 and the target tangential direction DL2. The own vehicle tangential direction DL1 is the direction facing the movement direction DR1 of the own vehicle 30 among the tangential directions of the first lane compartment line CL1 located on the side of the own vehicle 30. The target tangential direction DL2 is the direction facing the movement direction DR2 of the target 35 among the tangential directions of the second lane compartment line CL2 located on the side of the target 35. The direction facing the movement direction DR1 is a direction in which the angle formed by the movement direction DR1 is −90 degrees or more to 90 degrees or less relative to the movement direction DR1. The direction facing the movement direction DR2 is a direction in which the angle formed by the movement direction DR2 is −90 degrees or more to 90 degrees or less relative to the movement direction DR2. The calculation method of the angle formed by the two directions is the same as the calculation method described with reference to FIG. 8 of the first embodiment. Further, the first lane compartment line CL1 is the portion closest to the front end of the own vehicle 30 among the lane compartment lines located on either side of the front end of the own vehicle 30, and in the present embodiment, is the portion closest to the front end of the own vehicle 30 among the lane compartment lines located on the driving lane side of the target 35. Further, the second lane compartment line CL2 is the portion closest to the front end of the target 35 among the lane compartment lines located on either side of the front end of the target 35, and in the present embodiment, is the portion closest to the front end of the target 35 among the lane compartment lines located on the driving lane side of the own vehicle 30.

As shown in FIG. 7, the angle $\theta_2$ is the angle formed by the movement direction DR2 of the target 35 and the target tangential direction DL2. The angle $\theta_2$ is calculated relative to the movement direction DR2 by the same method as the calculation method described with reference to FIG. 8 of the first embodiment.

As shown in FIG. 10, after Step S10a, the collision determination unit 24 calculates the angular difference D1 by the absolute value of the difference (=angle $\theta_0$−angle $\theta_1$) between the angle $\theta_0$ and the angle $\theta_1$ (Step S10b). Note that, the collision determination unit 24 may calculate the angle $\theta_2$ after Step S10b. The state of the lane compartment line CL is calculated by Step S10a and Step S10b.

After Step S10b, the collision determination unit 24 uses the angular difference D1, the angle $\theta_2$ and the determination table 291a to determine the probability of a collision CP. As shown in FIG. 11, the determination table 291a is a table in which the probability of a collision CP is uniquely determined when the angular difference D1 and the angle $\theta_2$ are input. The extent of the probability of a collision CP is indicated by an integer from 1 to 10 in the same manner as the first embodiment.

The collision determination unit 24 determines that the probability of a collision CP is low as the angular difference D1 is within a range which includes smaller values. In short, when the angular difference D1 is the first angular difference (for example, 2 degrees), the collision determination unit 24 determines that the probability of a collision is low compared to when the second angular difference (for example, 25 degrees) is larger than the first angular difference.

Further, the collision determination unit 24 determines that the probability of a collision CP is low as the absolute value of the angle $\theta_2$ is within a range which includes smaller values. In short, when the absolute value of the angle $\theta_2$ is the first value (for example, 2 degrees), the collision determination unit 24 determines that the probability of a collision CP is low compared to when the second value (for example, 25 degrees) is larger than the first value. The collision avoidance control unit 25 performs the collision avoidance process in accordance with the determination result of the probability of a collision CP determined in Step S12a. The contents of the collision avoidance process performed by the collision avoidance control unit 25 are the same as in the first embodiment. In short, the extent of the collision avoidance process is determined with reference to the collision avoidance table 292 (FIG. 6), and the collision avoidance process is performed in accordance with the extent (determination result) of the probability of a collision CP.

Even if the amount of temporal change AA of the angle $\theta_0$ is the predetermined threshold or less, when the angular difference D1 is small, the likelihood that the target 35 is moving along the driving lane is high. On the one hand, when the angular difference D1 is high, the likelihood that the target 35 is not moving along the driving lane is high. According to the second embodiment, when the angular difference D1 is the first angular difference, the collision determination unit 24 determines that the probability of a collision CP is low compared to when the second angular difference is larger than the first angular difference (FIG. 11). Therefore, the collision determination unit 24 can more accurately determine the probability of a collision CP.

When the angle $\theta_2$ is small, the likelihood that the target 35 is moving along the driving lane is higher. Therefore, it can be estimated that the likelihood that the own vehicle 30 actually collides with the target 35 is low. According to the aforementioned second embodiment, when the angular difference D1 is the same value, the collision determination unit 24 determines that the probability of a collision CP is low compared to when the second value is larger than the first value when the absolute value of the angle $\theta_2$ is the first value. Therefore, the collision determination unit 24 can more accurately determine the probability of a collision CP.

[Correction Process of the Probability of a Collision]

In the aforementioned first embodiment or the second embodiment, the collision determination unit 24 may correct the probability of a collision CP with other elements. The correction process of the probability of a collision CP will be described below.

[First Correction Process]

In the aforementioned second embodiment, the collision determination unit 24 calculates the amount of temporal change AB of the angle $\theta_2$, and may correct the probability of a collision CP in accordance with the amount of change AB after Step S12a (FIG. 10). When the collision determination unit 24 performs the first correction process, the memory unit 29a stores the first amount of change table 296 shown in FIG. 12. The first amount of change table 296 is a table associated with the amount of change AB and the correction value CVa. The correction value CVa is a value which is added to the probability of a collision CP determined in Step S12a (FIG. 10). In short, when the correction value CVa is "−1", the numerical value of the probability of a collision CP determined in Step S12a decreases by one. Note that, when the corrected probability of a collision CP becomes zero or a negative value, the probability of a collision CP may be set to "1" which is the smallest value. The correction value CVa is set to a negative value when there is the amount of change AB which can be estimated that the movement direction DR2 has been intentionally changed in order for the target 35 to avoid a collision with the own vehicle 30. Specifically, when the amount of change AB is 10 degrees or more, the correction value CVa is set to "−1", and when the amount of change AB is less than 10 degrees, the correction value CVa is set to "0".

The collision determination unit 24 uses the angle $\theta_2$ calculated by the process in Step S10a (FIG. 10) over the past n times (n is an integer of 1 or more) and the process in the present Step S10a to calculate the amount of temporal change AB of the angle $\theta_2$. Moreover, after Step S12a, the collision determination unit 24 determines the correction value CVa with reference to the calculated amount of change AB and the first amount of change table 296, and uses the determined correction value CVa to correct the probability of a collision CP.

The collision avoidance control unit 25 uses the corrected probability of a collision CP and the collision avoidance table 292 (FIG. 6) to determine the extent of the collision avoidance process, and performs the collision avoidance process in accordance with the determined extent of the collision avoidance process.

According to the first correction process, when the amount of change AB is the first amount of change (for example, 15 degrees), the collision determination unit 24 determines that the probability of a collision CP is low compared to when the second amount of change (for example, 5 degrees) is smaller than the first amount of change. Generally, when the amount of change AB is high, it can be estimated that the movement direction DR2 has been intentionally changed in order for the target 35 to avoid collision with the own vehicle 30. Therefore, collision determination having an even higher accuracy can be performed by the collision determination unit 24 performing the first correction process.

[Second Correction Process]

In the aforementioned first and second embodiments, the collision determination unit 24 calculates the amount of temporal change AC of the angle $\theta_0$, and may correct the probability of a collision CP in accordance with the amount of change AC after Step S12 and Step S12a (FIGS. 3 and 10). The second correction process is preferably performed when Step S6 is omitted. When the collision determination unit 24 performs the second correction process, the memory units 29,29a store the second amount of change table 297 shown in FIG. 13. The second amount of change table 297 is a table associated with the amount of change AC and the correction value CVb. The correction value CVb is a value which is added to the probability of a collision CP determined in Step S12 (FIG. 3) and Step S12a (FIG. 10). In short, when the correction value CVb is "−1", the numerical value of the probability of a collision CP determined by Steps S12 and S12a decreases by one. Note that, when the corrected probability of a collision CP becomes zero or a negative value, the probability of a collision CP may be set to "1" which is the lowest value. The correction value CVb is set to a negative value when there is an amount of change AC which can be estimated that the movement direction DR2 has been intentionally changed in order for the target 35 to avoid a collision with the own vehicle 30. Specifically, when the amount of change AC is 10 degrees or more, the correction value CVb is set to "−1", and when the amount of change AC is less than 10 degrees, the correction value CVb is set to "0".

The collision determination unit 24 uses the angle $\theta_0$ calculated by the process of Step S4 over the past n times (n is an integer of 1 or more) and the angle $\theta_0$ calculated by the process of the present Step S4 to calculate the amount of temporal change AC of the angle $\theta_2$. Moreover, after Steps S12 and S12a, the collision determination unit 24 determines the correction value CVb with reference to the calculated amount of change AC and the second amount of change table 297, and uses the determined correction value CVb to correct the probability of a collision CP. The collision avoidance control unit 25 uses the corrected probability of a collision CP and the collision avoidance table 292 to determine the extent of the collision avoidance process, and performs the collision avoidance process in accordance with the determined extent of the collision avoidance process. Note that, when the collision determination unit 24 calculates the amount of change AA in Step S6, the amount of change AA is deemed to be the amount of change AC and may determine the correction value CVb. Further, when performing the process of Step S6, the amount of change AC specified in the second amount of change table 297 may be determined within the range of the threshold or less specified in the threshold table 294.

According to the second correction process, when the amount of change AC is the amount of change of the first angle (for example, 15 degrees), the collision determination unit 24 determines that the probability of a collision CP is low compared to when the amount of change of the second angle (for example, 5 degrees) is smaller than the amount of change of the first angle. Generally, when the amount of change AC is high, it can be estimated that the movement direction DR2 has been intentionally changed in order for the target 35 to avoid collision with the own vehicle 30. Therefore, collision determination having an even higher accuracy can be performed by the collision determination unit 24 performing the second correction process.

[Third Correction Process]

In the aforementioned first and second embodiments, the collision determination unit 24 determines the type of lane compartment line CL, and may correct the probability of a collision CP in accordance with the type of lane compartment line CL. When the collision determination unit 24 performs the third correction process, the memory units 29,29a store the compartment line correction table 298 shown in FIG. 14. The compartment line correction table 298 is a table associated with the type of lane compartment line CL and the correction value CVc. The correction value CVc is a value which is added to the probability of a collision CP determined in Step S12 (FIG. 3) and Step S12a (FIG. 10). In short, when the correction value CVc is "−1", the numerical value of the probability of a collision CP determined in Steps S12 and S12a decreases by one, and when the correction value CVc is "1", the numerical value of the probability of a collision CP determined in Steps S12 and S12a becomes one higher. Note that, when the corrected probability of a collision CP becomes zero or a negative value, the probability of a collision CP is set to "1" which is the smallest value, and when the corrected probability of a collision CP is in excess of "10", the probability of a collision CP may be set to "10" which is the greatest value.

In the compartment line correction table 298, the type of lane compartment line CL indicates the type of lane compartment line CL located between the own vehicle 30 and the target 35. The first type is a lane compartment line indicating that a course change is prohibited, and the second type is a lane compartment line which does not that a course change is prohibited. Examples of the first type of lane compartment line include a median strip, yellow lines, a center line and the like. Examples of the second type of lane compartment line include dotted white lines and the like. Before performing the correction process of the probability of a collision CP, the collision determination unit 24 determines whether the lane compartment line CL (correction target lane compartment line CL) located between the own vehicle 30 and the target 35 is either of the first type of lane compartment line or the second type of lane compartment line based on the captured images acquired from the image sensor 14. This determination is made by performing pattern matching with the captured images and data such as the shape and color of the various lane compartment lines. The data such as the shape and color of the various lane compartment lines is stored in the memory units 29,29a.

The collision determination unit 24 uses the determined type of correction target lane compartment line CL and the compartment line correction table 298 to determine the correction value CVc, and uses the determined correction value CVc to correct the probability of a collision CP. The collision avoidance control unit 25 uses the corrected probability of a collision CP and the collision avoidance table 292 to determine the extent of the collision avoidance process, and performs the collision avoidance process in accordance with the determined extent of the collision avoidance process.

According to the third correction process, when the correction target lane compartment line CL indicates the prohibition of a course change, the collision determination unit 24 determines that the probability of a collision CP is low compared to when the correction target lane compartment line CL does not indicate the prohibition of a course change. Therefore, the collision determination unit 24 can perform collision determination having an even higher accuracy.

MODIFICATIONS

First Modification Example

Figure 15:
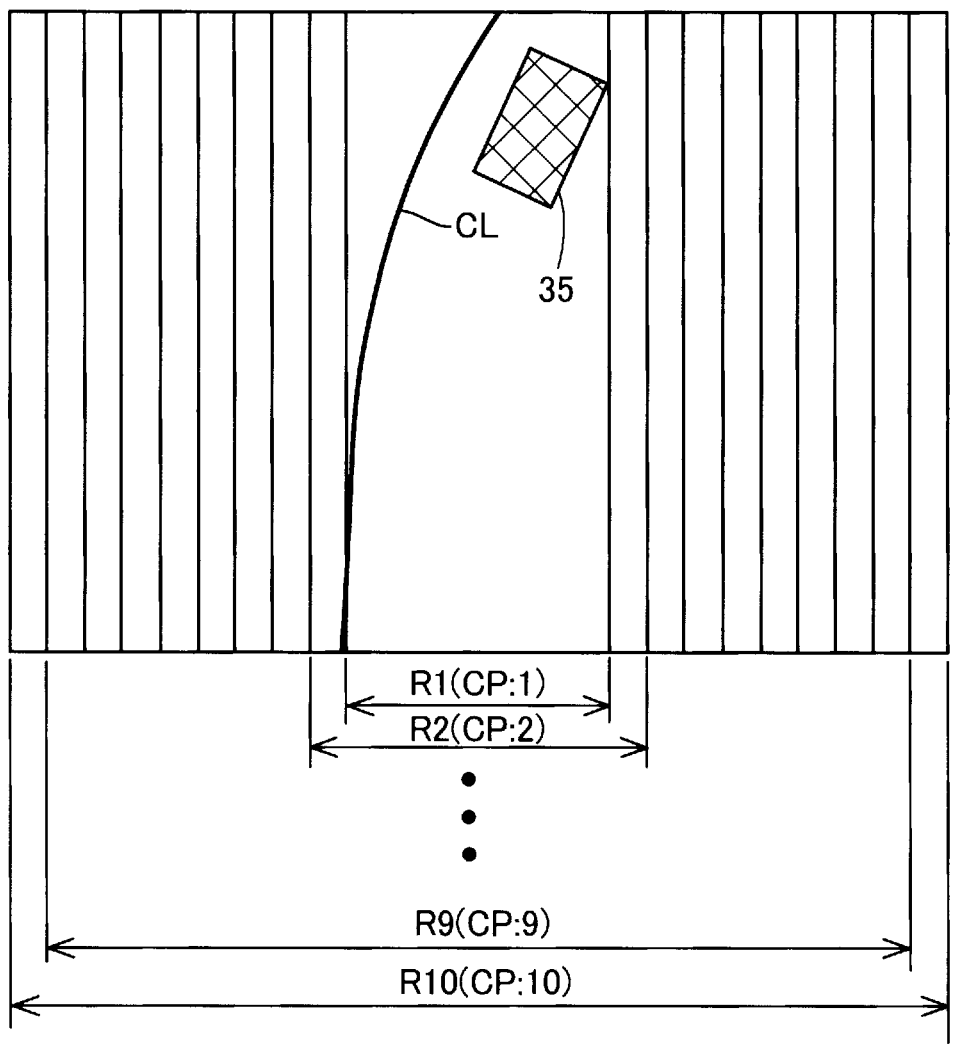
FIG. 15 is a drawing conceptually showing the relationship between the probability of a collision and the determination area.

In each of the aforementioned embodiments, the determination area which determines the probability of a collision CP between the own vehicle 30 and the target 35 was a constant area, but the determination area is not limited thereto. For example, the lower the probability of a collision CP determined by the collision determination unit 24, the more the determination area used in the determination of the subsequent probability of a collision may be reduced. For example, as conceptually shown in FIG. 15, the collision determination unit 24 stores the numerical value of the collision possibility CP determined by in the previous collision determination process and the determination areas R1 to R10 used in the subsequent collision determination process in association with each other in the memory units 29,29a. The determination areas R1 to R10 are specified by the two dimensional coordinates of the width direction and the vertical direction of the own vehicle 30. The lower the previous probability of a collision CP, the higher the ECU 20 sets the determination area used in the subsequent collision determination process to be smaller with reference to the data in the memory units 29,29a which determined the probability of a collision CP and the determination area. In the present modification example, the lower the probability of a collision CP, the more the size of the left-right direction of the determination area (width direction of the own vehicle 30) is reduced. Thereby, when the probability of a collision CP between the own vehicle 30 and the target 35 is low, the amount of data for collision determination can be reduced, thus, the processing load of the on-board system 10 can be decreased.

Second Modification Example

In each of the aforementioned embodiments, the target 35 in the opposite lane traveling in front of the own vehicle 30 was described as an example regarding the determination of the probability of a collision CP and the collision avoidance process performed by the on-board system 10, but is not limited thereto. For example, even in the case when the own vehicle 30 is located in one lane among the adjacent lanes for moving in the same direction, and the target 35 is located in front of the own vehicle 30 in another lane, the determination of the probability of a collision and the collision avoidance process may be performed. Further, for example, even in the case when the target 35 is on a lane that merges with the lane where the own vehicle 30 travels, and, is traveling in front of the own vehicle 30, the determination of the probability of a collision and the collision avoidance process may be performed.

Third Modification Example

By combining the aforementioned first embodiment with the aforementioned second embodiment, the collision determination unit 24 may perform the collision determination process. Specifically, the collision determination unit 24 uses the determination table 291 (FIG. 5) to determine the probability of a collision CP. Moreover, the probability of a collision CP is corrected by using the correction table 291d shown in FIG. 16 in which the correction value CVd was inputted in place of the probability of a collision CP in the determination table 291a of the second embodiment and adding the correction value CVd to the probability of a collision CP.

Further, the collision determination unit 24 may determine the probability of a collision CP by combining the collision determination processes of the aforementioned first embodiment and the aforementioned second embodiment with at least one of the aforementioned first to third correction processes.

The present disclosure is not limited to the above-described embodiment and modification examples. The present disclosure can be actualized by various configurations without departing from the scope of the disclosure. For example, the technical features in the embodiment, examples and modification examples corresponding to the technical features of each aspect described in the Summary can be exchanged or combined as appropriate to solve some or all of the above-described issues or to achieve some or all of the above-described effects. In addition, unless stated in the present specification as being an essential feature, the technical features can be omitted as appropriate.

What is claimed is:

1. A collision determination device for determining a possibility of a collision between an own vehicle and a target in a determination area surrounding the own vehicle, the collision determination device comprising:
   an orientation detection unit for detecting orientation of the target relative to the own vehicle;
   an image sensor for capturing images surrounding the own vehicle;
   an angle calculation unit for calculating a first angle $\theta_0$ formed by a movement direction of the own vehicle and a movement direction of the target; and
   a collision determination unit for using image data acquired from the image sensor to
   determine a state of a lane compartment line on a road on which the own vehicle travel, and
   determine a probability of collision between the own vehicle and the target based on the first angle $\theta_0$ and the state of the lane compartment line, wherein
   the collision determination unit determines the probability of collision to be lower for a state in which the lane compartment line is located between the own vehicle and the target than for a state in which the lane compartment line is not located between the own vehicle and the target, and
   the collision determination unit determines the probability of collision to be lower for a state in which the lane compartment line indicates prohibition of a course change than for a state in which the lane compartment line does not indicate prohibition of the course change.

2. The collision determination device according to claim 1, wherein the collision determination unit determines the probability of collision to be lower, when the first angle $\theta_0$ is the same, for a state in which the lane compartment line is located between the own vehicle and the target than for a state in which the lane compartment line is not located between the own vehicle and the target.

3. The collision determination device according to claim 1, wherein:
   the collision determination unit, calculates a second angle $\theta_1$ formed between an own vehicle tangential direction facing the movement direction of the own vehicle of the tangential direction of a first lane compartment line located on a side of the own vehicle, and a target tangential direction facing the movement direction of a target of the tangential direction of a second lane compartment line located on a side of the target; and
   the probability of collision decreases as an angular difference D1, which is an absolute value of a difference between the first angle $\theta_0$ and the second angle $\theta_1$, decreases.

4. The collision determination device according to claim 3, wherein
   a third angle $\theta_2$ is formed between the movement direction of the target and the target tangential direction, and
   wherein the probability of collision decreases as an absolute value of the third angle $\theta_2$ decreases.

5. The collision determination device according to claim 4, wherein
   the probability of collision decreases as an amount of temporal change of the third angle $\theta_2$ decreases.

6. The collision determination device according to claim 1, wherein
   the probability of collision decreases as an amount of temporal change of the first angle $\theta_0$ decreases.

7. The collision determination device according to claim 1, wherein
   the determination area for determining the probability of collision decreases as the probability of collision decreases.

8. The collision determination device according to claim 1, wherein determining the state of the lane compartment line comprises determining what type of line the lane compartment line comprises.

9. A collision avoidance system comprising:
   a collision determination device for determining a possibility of a collision between an own vehicle and a target in a determination area surrounding the own vehicle, the collision determination device comprising:
      an orientation detection unit for detecting orientation of the target relative to the own vehicle;
      an image sensor for capturing images surrounding the own vehicle;
      an angle calculation unit for calculating a first angle $\theta_0$ formed by a movement direction of the own vehicle and a movement direction of the target; and
      a collision determination unit for using image data acquired from the image sensor to
         determine a state of a lane compartment line on a road on which the own vehicle travels, and
         determine a probability of collision between the own vehicle and the target based on the first angle $\theta_0$ and the state of the lane compartment line, wherein the collision determination unit determines the probability of collision to be lower for a state in which the lane compartment line is located between the own vehicle and the target than for a state in which the lane compartment line is not located between the own vehicle and the target, and the collision determination unit determines the probability of collision to be lower for a state in which the lane compartment line indicates prohibition of a course change than for a state in which the lane compartment line does not indicate prohibition of the course change; and a collision avoidance device configured to reduce an extent of a collision avoidance process as the probability of collision decreases.

10. The collision avoidance system according to claim 9, wherein the extent of the collision avoidance process is reduced by delaying at least a time period in which the collision avoidance process is executed.

* * * * *